United States Patent Office 3,441,509
Patented Apr. 29, 1969

3,441,509
STRIPPING SOLUTION
Keisho Aoki, Tokyo, Japan, assignor to
Hagaron Co., Ltd., Tokyo, Japan
No Drawing. Filed Feb. 21, 1966, Ser. No. 528,763
Int. Cl. C11d 1/86
U.S. Cl. 252—161          1 Claim

ABSTRACT OF THE DISCLOSURE

An agent for stripping an affix, such as a postage stamp, from a substrate to which it adheres, is constituted by an aqueous solution of alkylbenzenesulfonate or a mixture thereof with polyoxyethylene alkylphenol ether, together with alum (to prevent color blurring of a printing ink), at a pH of 7 to 9.

---

This invention relates to a quick-acting stripping solution composed essentially of an anionic surface active agent or of a mixture thereof with a non-ionic surface active agent.

In particular, the composition of the invention is characterized in that it is composed essentially of alkylbenzene sulfonate with or without admixture of polyoxyethylene alkylphenol ether, and an agent for preventing color blurring of printing ink, e.g., alum, added thereto and dissolved altogether in water, with the pH of the resulting composition adjusted to a range of 7 to 9.

The invention is described in more detail with reference to an example thereof. To 100% of water, alkylbenzene sulfonate of the formula

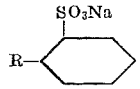

wherein R represents an alkyl radical most preferably having 12 to 16 carbon atoms with or without admixture of polyoxyethylene alkylphenol ether of the formula

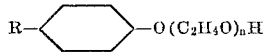

wherein R represents an alkyl radical most preferably having 12 to 14 carbon atoms is added in an amount of or in a combined amount of 1 to 5%, and 0.01 to 0.1% of alum and a little amount of flavor are added, and the pH of the solution is adjusted to a range of 7 to 9.

In order to peel off paper sheets such as postage stamps pasted on surfaces with starch or vinyl paste, it has been the general practice to dip them in water or expose them to steam so as to dissolve the adhesive in water. Such procedures cause much inconveniences because they take much time, cause trouble, and may invite blurring of printing ink.

According to the present invention, the solution provided is composed essentially of an anionic surface active agent (i.e. alkylbenzene sulfonate) with or without admixture of a non-ionic surface active agent (i.e. polyoxyethylene alkylphenol ether), and a little amount of an agent for preventing color blurring of printing ink, such as alum, with the pH adjusted to a range of 7 to 9. With such a composition, the solution is very effective for the stripping purpose because it most quickly dissolves starch and vinyl pastes and because the anti-blurring agent mixed therein prevents color blurring of the printing ink on the matter to be peeled off.

I claim:
1. A stripping solution which is composed essentially of 1 to 5% of (a) alkylbenzene alkali metal sulfonate wherein the alkyl group contains from 12 to 16 carbon atoms or of (b) a mixture of said sulfonate with polyoxyethylene alkylphenol ether wherein the alkyl group contains from 12 to 14 carbon atoms, and 0.01 to 0.1% of alum as an agent for preventing color blurring of printing ink, in solution in water, the pH of the solution being within the range of 7 to 9.

References Cited

UNITED STATES PATENTS 3,062,749  11/1962  Herrling _____ 252—170

LEON D. ROSDOL, Primary Examiner.

B. BETTIS, Assistant Examiner.

U.S. Cl. X.R.

252—152